United States Patent Office 2,876,226
Patented Mar. 3, 1959

2,876,226

WERNER COMPLEXES OF METAL CYANIDES

William D. Schaeffer, Pomona, Calif., assignor to Union Oil Company of California, Los Angeles, Calif., a corporation of California No Drawing. Application November 19, 1956
Serial No. 622,834

5 Claims. (Cl. 260—270)

This invention relates to certain new Werner complexes which are found to exhibit the unusual property of selectively absorbing, or "clathrating," ortho-xylene into their crystal structure in preference to the other xylene isomers. They may hence be employed for separating o-xylene from mixtures containing any one or more of the other C-8 aromatic isomers.

The new complexes consist of certain metal cyanides coordinated with substantially two moles of 4-ethyl pyridine. They may be designated by the following general formula:

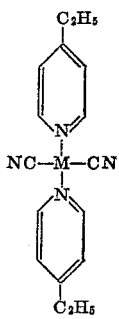

wherein M is a metal of atomic number 25 to 28 (i. e. manganese, iron, cobalt or nickel).

When any of the above complexes are triturated with, or precipitated in the presence of, a liquid mixture of isomeric xylenes, it is found that the o-xylene is selectively integrated into the crystal structure, forming what is presently regarded as a "clathrate." Ethylbenzene is most strongly rejected from the clathrate. The solid clathrate may then be separated from the liquid phase, and decomposed with acid or heat to recover the selectively clathrated hydrocarbon.

The new complexes may be easily prepared by simply admixing the proper mole-ratios of metal cyanide (one mole), and the pyridine base (two moles or more), normally at room temperatures, although higher or lower temperatures may be employed. If desired the metal cyanide may be first dissolved in a solvent such as water containing excess cyanide ions, e. g. KCN, and the complex precipitated by addition of the 4-ethyl-pyridine. The complexes are substantially insoluble in water, and soluble in chloroform and methyl Cellosolve.

When working in aqueous solutions, it is not necessary to start with pure metal cyanides. Any soluble salt which forms a more soluble complex with the pyridine base than does the cyanide may be initially dissolved in the solvent; cyanide ions are then added, and finally the 4-ethyl-pyridine, whereupon the less soluble cyanide complex is selectively precipitated in accordance with the laws of mass action. The complexes of the metal halides are much more soluble in water than the corresponding cyanides, and hence it is convenient to use solutions of metal chlorides or bromides as starting materials, first adding an excess of alkali metal cyanide, e. g. NaCN, KCN, etc., then adding the 4-ethyl-pyridine. The resulting precipitate is then recovered by filtration, washed with water, or other appropriate solvent, and dried at low temperatures, e. g. 25°–100° C. Higher temperatures are likely to cause decomposition.

Alternatively, the 4-ethyl pyridine may be first dissolved in an ethanol-water mixture along with the alkali metal cyanide, and then the divalent metal halide added, whereupon the divalent metal cyanide complex precipitates. This procedure is illustrated in the following example:

EXAMPLE I

About 42.8 grams (0.4 mole) of 4-ethylpyridine was dissolved in a mixture of 20 ml. of ethanol and 80 ml. of water. A solution of 13.0 gms. (0.2 mole) of KCN in 100 ml. of water was then added. Finally, a solution of 19.8 gms. (0.1 mole) of manganous chloride $$(MnCl_2 \cdot 4H_2O)$$

in 50 ml. of water was added, whereupon a brown precipitate was formed. After stirring for 30 minutes, the slurry was filtered, and the precipitate washed with water, and air-dried for several hours. The light tan product turns brown at 180° C., and melts at above 300° C. By elemental analysis the product was found to contain: H—6.0%, N—17.1%, Mn—17.4%, and was hence manganese di-(4-ethyl-pyridine) dicyanide.

By substituting mole-equivalent proportions of nickel, iron or cobalt chlorides for manganese chloride in the above example, the corresponding Werner complexes are obtained in similar yields and purities. The resulting complexes are:

| Complex | Physical Appearance |
|---|---|
| 1. Nickel di-(4-ethylpyridine) dicyanide | Blue solid. |
| 2. Ferrous di-(4-ethylpyridine) dicyanide | Tan solid. |
| 3. Cobalt di-(4-ethylpyridine) dicyanide | Pink solid. |

All of the above complexes exhibit selective clathrating properties for o-xylene, similar to that shown in the following example:

EXAMPLE II

About 15 gms. of the complex prepared in Example I was dissolved with heating in 200 ml. of methyl Cellosolve. Ten ml. of mixed xylenes and 1 ml. of 4-ethyl pyridine were then added, and the solution was cooled whereupon a brown precipitate was formed, which was recovered by filtration and washed with 10 ml. of isooctane. The precipitate was then dissolved in 20 ml. of dilute (50/50) HCl, and the hydrocarbon phase was separated, washed three times with water and dried over $Na_2SO_4$. Ultra violet spectranalysis of the hydrocarbon phase, and of the original xylene, showed that the isomer distribution was as follows:

Table 1

| | Volume Percent | | | |
|---|---|---|---|---|
| | p-xylene | m-xylene | o-xylene | Et. Bz. |
| Feed | 19.9 | 45.5 | 19.3 | 15.3 |
| Hydrocarbon from Clathrate | 19.1 | 41.8 | 36.3 | 2.8 |

It is apparent that the complex exhibits substantially no tendency to clathrate ethylbenzene, and a strong preference for o-xylene. It may hence be used for removing small amounts of o-xylene, m-xylene, or p-xylene from ethylbenzene, whereby pure ethylbenzene is obtained.

In addition to their use as clathrate-formers, the complexes are also useful in other fields as e. g. insecticides, oil-soluble metal carriers, oxidation accelerators for paints and the like. Their solubility in many organic solvents, e. g. chloroform, renders them useful as impregnants for intimately depositing catalytic metals on hydrophobic surfaces as e. g. activated carbon and the like. Other uses will be apparent to those skilled in the art.

Other specific complexes, methods of preparation and uses will readily occur to those skilled in the art. The true scope of the invention is intended to be embraced by the following claims:

I claim:

1. A Werner complex having the formula:

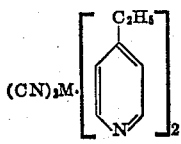

wherein M is a metal of atomic number 25 to 28 inclusive.

2. Nickel di(4-ethylpyridine) dicyanide.
3. Cobalt di(4-ethylpyridine) dicyanide.
4. Manganese di(4-ethylpyridine) dicyanide.
5. Ferrous di(4-ethylpyridine) dicyanide.

References Cited in the file of this patent

FOREIGN PATENTS 714,202  Great Britain _____ Aug. 25, 1954